(12) United States Patent
Kopetzky

(10) Patent No.: US 6,202,952 B1
(45) Date of Patent: Mar. 20, 2001

(54) SAFETY BELT APPARATUS WITH AN ACCELERATION SENSOR

(75) Inventor: Robert Kopetzky, Lonsee (DE)

(73) Assignee: Takata (Europe) Vehicle Safety Technology GmbH (DE)

( * ) Notice: Subject to any disclaimer, the term of this patent is extended or adjusted under 35 U.S.C. 154(b) by 0 days.

(21) Appl. No.: 09/369,193

(22) Filed: Aug. 6, 1999

(30) Foreign Application Priority Data

Aug. 6, 1998 (DE) .............................................. 198 35 672

(51) Int. Cl.$^7$ ................................................. B60R 22/40
(52) U.S. Cl. ..................................... 242/384.4; 242/384.6
(58) Field of Search ............................ 242/384.4, 384.5, 242/384.6; 297/478; 280/806

(56) References Cited

U.S. PATENT DOCUMENTS

| 4,087,059 | * | 5/1978 | Lindblad | 242/384.4 |
| 5,289,986 | * | 3/1994 | Hoshihara | 242/384.4 |
| 5,351,908 | * | 10/1994 | Umezawa et al. | 242/384.4 |
| 5,791,582 | * | 8/1998 | Ernst | 242/384.4 |

FOREIGN PATENT DOCUMENTS

| 25 23 675 | | 11/1975 | (DE) . | |
| 41 09 179 | | 9/1991 | (DE) . | |
| 195 28 387 | | 2/1997 | (DE) . | |
| 195 31 320 | | 2/1997 | (DE) . | |
| 2073578 | * | 10/1981 | (GB) | 242/384.4 |

* cited by examiner

Primary Examiner—John M. Jillions
(74) Attorney, Agent, or Firm—Foley & Lardner

(57) ABSTRACT

The invention relates to a safety belt apparatus comprising a belt roller (12) which is preferably resiliently subjected to a bias force in the belt wind-up direction, which carries a more or less rolled up belt (11) and which can be blocked against a further drawing out by a tooth blocking mechanism which can be triggered by an acceleration sensor (13) preferably having a movable mass, such as a ball (35), which has a position control gear (18) which is preferably coaxial with the belt roller (12) and which is rotationally fixedly connected to an auxiliary blocking tooth crown (14) which is directly stressed by an auxiliary pawl (17) of the acceleration sensor (13) and which drives a main pawl (16) which is rotationally fixedly coupled to the belt roller (12) into a main blocking tooth crown (15) which is fixed to the housing when stopped by the auxiliary pawl (17) and in the presence of a drawing out force at the belt (11) whereupon the further drawing out of the belt is stopped. The invention consists in that the auxiliary blocking tooth crown (14) is designed as an inner tooth crown at a secondary gear (19) which is coupled in a rotationally fixed manner to, in particular which meshes with, the position control gear (18), preferably coaxially; and in that the acceleration sensor (13) is arranged in the interior of the auxiliary inner blocking tooth crown (14) so as to be displaceable at least about an axis (20, 21) in such a manner that with a corresponding constructional design of the auxiliary pawl (17) the latter can come into blocking engagement with the inner tooth crown (14) in any installation position of the acceleration sensor (13).

14 Claims, 2 Drawing Sheets

SAFETY BELT APPARATUS WITH AN ACCELERATION SENSOR

BACKGROUND

The invention relates to a safety belt apparatus.

Safety belt apparatuses of this kind are widespread and are eg. known from GB 2 131 279 B. They have an acceleration sensor which consists for example of a movable ball and a pivot arm with a latching pawl and which allows the pawl to move outwardly at specific accelerations and/or tiltings of the vehicle, through which the rotation of the position control gear which normally takes place together with the belt roller is stopped. In so far as the belt roller is then rotated further in the draw-out direction by the draw force at the safety belt, a transmission mechanism which is placed between the position control gear and the belt roller is set in motion, which allows a main pawl to engage into a main blocking tooth crown. Since the main pawl is rotationally fixedly connected to the belt roller and the main blocking tooth crown is fixed to the housing, the draw-out movement of the belt roller is stopped in this manner. In this it is essential that the teeth of the auxiliary pawl and of the main pawl stand relative to one another in the peripheral direction in such a manner that after the latching in of the auxiliary pawl into the auxiliary blocking tooth crown the main pawl is located just between two teeth of the main blocking tooth crown and can thus latch in between two teeth of the main blocking tooth crown when moving outwards as a result of the action of the acceleration sensor.

The action of the acceleration sensor is based, as mentioned, on the fact that a ball is normally held in a depression of the auxiliary pawl and is moved more or less out of this depression through accelerations, with the auxiliary pawl being pivoted into the extension direction and finally engaging into the auxiliary blocking tooth crown of the position control gear. As a result of this mode of action the acceleration sensor must be arranged horizontally in the vehicle in such a manner that the ball is moved out of the depression which ensures the unlatching only during horizontal accelerations.

The belt rollers of safety belt apparatuses are now however increasingly being arranged in the vehicle not only in a horizontal arrangement, for example at the vehicle floor, but also at the most varied of angles to the horizontal. In these cases the acceleration sensor would already respond in the state of rest, that is, no longer be capable of functioning, if it is not—in deviation from the usual arrangement—attached in another manner at the housing of the belt roller in such a manner that that it only responds to horizontal accelerations of the movable mass, which is designed in particular as a ball, but otherwise leaves the auxiliary blocking tooth crown unstressed however. A known solution of this problems provides that the acceleration sensor can be secured at different points of the periphery of the position control gear at the housing of the belt winder with it being possible to take into account different installation positions of the belt winder in respect to the horizontal. This embodiment is however constructionally complicated and expensive because space for a desired attachment of the acceleration sensor must be present all about the position control gear.

SUMMARY OF THE INVENTION

The object of the present invention consists in providing a safety belt apparatus of the initially named kind in which a specific place is provided for the acceleration sensor, but which can equally at any time be displaced, in particular tilted, relative to the housing in such a manner that it reacts only to horizontal accelerations and tiltings of the vehicle.

The idea of the invention is thus to be seen in that the auxiliary pawl of the acceleration sensor is no longer allowed to grip on directly at the position control gear, but rather at a hollow secondary gear which is rotationally fixedly coupled to, in particular meshed with, the latter and has the blocking teeth on its inner side. In this way the outer toothing of the position control gear is not—as is usual—designed as a ratchet toothing which cooperates directly with a pawl, but rather as a normal gear toothing.

The acceleration sensor is thus arranged in the interior of the secondary gear and can be pivotally fixed ultimately in any manner desired about one or more axes so that it can always be displaced into the horizontal position required for its functioning no matter how the belt roller is installed into the vehicle. In this the auxiliary pawl must be shaped in such a manner that it can arrive into engagement with the auxiliary tooth crown in any installation position of the acceleration sensor.

It is particularly important that the numbers of teeth of the main and auxiliary blocking tooth crown stand in the relationships described below in order always to ensure an unobjectionable engaging of the main pawl into the main tooth crown after the latching in of the auxiliary pawl of the acceleration sensor.

In order to be able in any case to produce an unobjectionable relative starting position between the auxiliary and the main tooth crown, a procedure described further below can be followed. Thus although the two tooth crowns are no longer arranged at gears which are coaxial with one another and rotate in the same way, an unobjectionable driving in of the main pawl into the main tooth crown can be ensured in this manner.

Preferred diameter relationships of the secondary and position control gear are as described below.

BRIEF DESCRIPTION OF THE DRAWINGS

The invention will be explained in the following in an exemplary manner with reference to the drawings; in these are shown.

DETAILED DESCRIPTION

Figure 1:
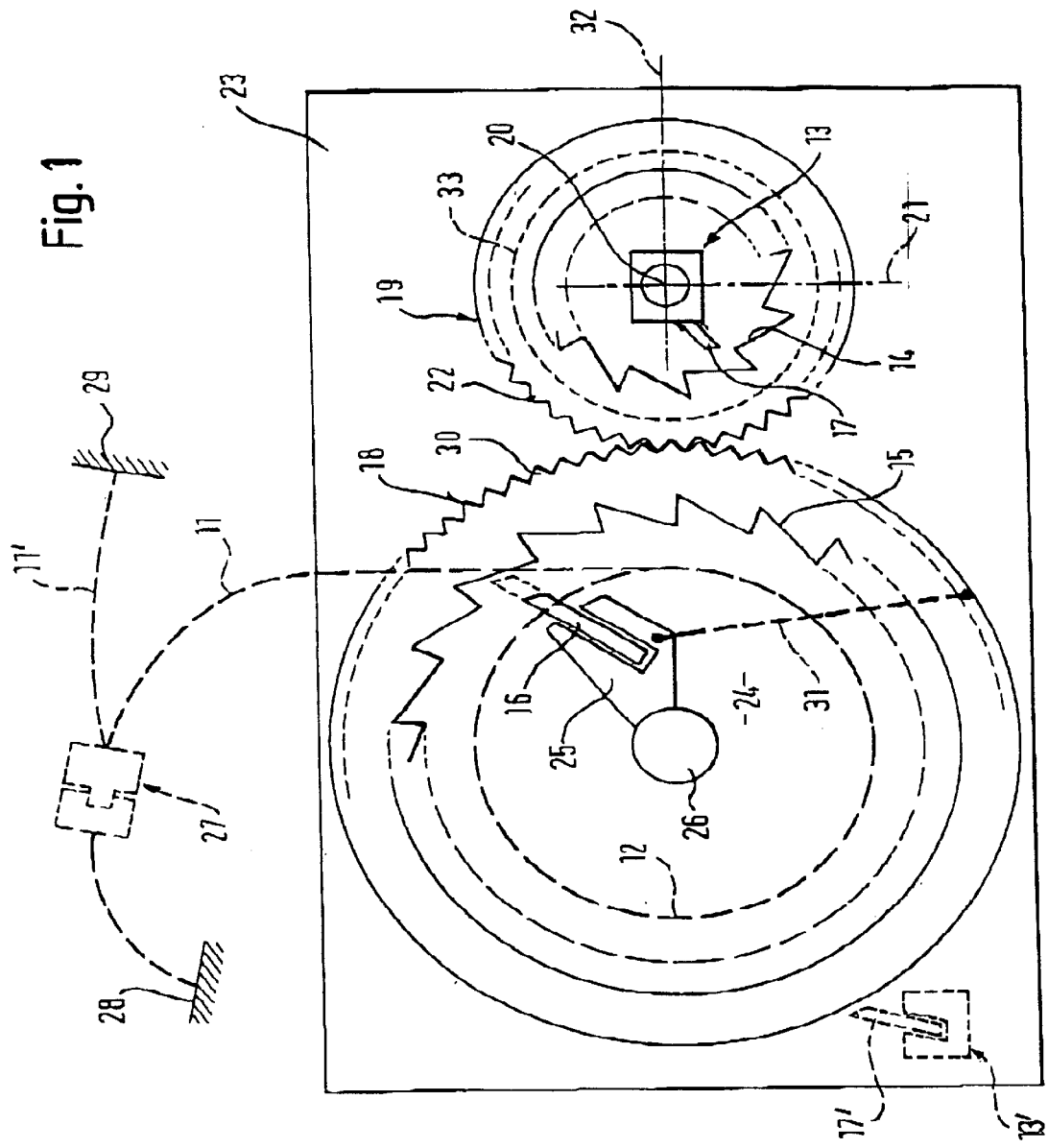
FIG. 1 a purely schematic side view of the belt winder of a safety belt apparatus in accordance with the invention, FIG. 2 a partly sectioned schematic plan view of a further embodiment of the belt winder of a safety belt apparatus in accordance with the invention, FIG. 3 a corresponding partly sectioned plan view of a further variant embodiment and FIG. 4 a view analogous to FIG. 1 with a special displaceable embodiment of the acceleration sensor.

In accordance with FIG. 1 an opening 24 is provided in a wall of a housing 23 of a belt winder which is outwardly limited by a circular main inner blocking tooth crown 15 into which a main pawl 16 can engage substantially radially from within which is substantially radially outwardly displaceably arranged in a suitable guide 25 which in turn is rotationally fixedly connected to the shaft 26 of a belt roller 12. The belt roller 12 is only indicated in broken lines just as is the belt 11 which is more or less wound up on it and which is guided via a lock 27, which is merely indicated in broken lines, to a securing point 28 at the vehicle body. A further belt part 11' extends in the usual manner from the belt lock 27 to a third belt securing point 29 at the vehicle body.

Substantially rotationally fixedly connected to the belt roller 12 is a position control gear 18 which is provided with an outer toothing 30 and which in accordance with the prior art has outwardly a ratchet toothing which cooperates with an acceleration sensor 13' which is secured at the housing 23 and is only indicated in broken lines and of which the pawl 17', when moved out of the acceleration sensor 13', can blockingly engage into an outer toothing which is provided with blocking teeth. An soon now as the position control gear 18 is hindered in a further rotation in the draw-out direction, but the belt roller 12 is however further rotated in the draw-out direction, a transmission 31, which is known in the prior art and is therefore not described here in detail and is merely indicated as a broken line, effects a moving out of the main pawl 16 into the position in broken lines in FIG. 1, through which the rotational movement of the shaft 26 in the belt draw-out direction is ended and a further drawing out of the safety belt 11 is prevented.

After the termination of a horizontal acceleration of the ball which is present in the acceleration sensor 13' the pawl 17' unlatches again out of the outer ratchet toothing and thereby frees the rotation of the position control gear 18 anew so that the main pawl again comes out of engagement with the main blocking tooth crown 15 via the transmission 31 and non-illustrated springs, and the belt 11 can be drawn out again.

In accordance with the invention the outer toothing 30 of the position control gear 18 is now no longer a ratchet toothing, but rather a normal gear outer toothing which meshes with a complementary outer toothing 22 of a secondary gear 19 which can be rotated about an axis of rotation 20 which extends parallel to the shaft 26. The gear 19 is designed to be hollow or, respectively, has a coaxial hollow appendage which is provided with an auxiliary inner blocking tooth crown 14. The diameter of the gear 19 is half as large as that of the outer toothing 30 of the position control gear 18. Accordingly, the number of the teeth of the auxiliary inner blocking tooth crown 14 is half as large as the number of the teeth of the main blocking tooth crown 15.

In accordance with the invention an acceleration sensor 13 with an auxiliary pawl 17 which can be moved outwardly in the event of horizontal accelerations and which engages blockingly into a tooth of the auxiliary inner blocking tooth crown 14 in the extended state is provided in the interior of the auxiliary inner blocking tooth crown 14.

The effect is thus analogous to that of the acceleration sensor 13' in accordance with the prior art, with it however being possible through the arrangement of the acceleration sensor 13 at different angles about the axis of rotation 20 to ensure that the functional plane 32 which is provided for an unobjectionable operation of the ball 35 extends horizontally independently of the installation of the housing 23 into a vehicle.

Since during the displacement of the acceleration sensor 13 about the axis of rotation 20 however the pawl 17 now comes in each case into engagement at different positions with the inner tooth crown 14, a possibility should be created of likewise displacing the teeth of the inner tooth crown 14 about the axis of rotation 20 after a displacement of the acceleration sensor 13. For this the gear 19 can consist of two coaxial rings which lie one on the other along a broken circular line 33 in FIG. 1 which is coaxial to the axis of rotation 20. The inner tooth crown 14 can thus be displaced in the peripheral direction relative to the outer toothing 22 in the desired manner. Then the two concentric partial rings must again be fixed relative to one another.

It is even more simple when the secondary gear 19 can be temporarily brought out of engagement with the position control gear 18 through a suitable fastening, whereupon a rotation of the gear 19 up to a desired relative position between the auxiliary pawl 17 and the inner tooth crown 14 can then take place. Through this the two gears are again brought into engagement and the required relative position between the auxiliary pawl 17 and the inner tooth crown 14 is produced.

Figure 2:
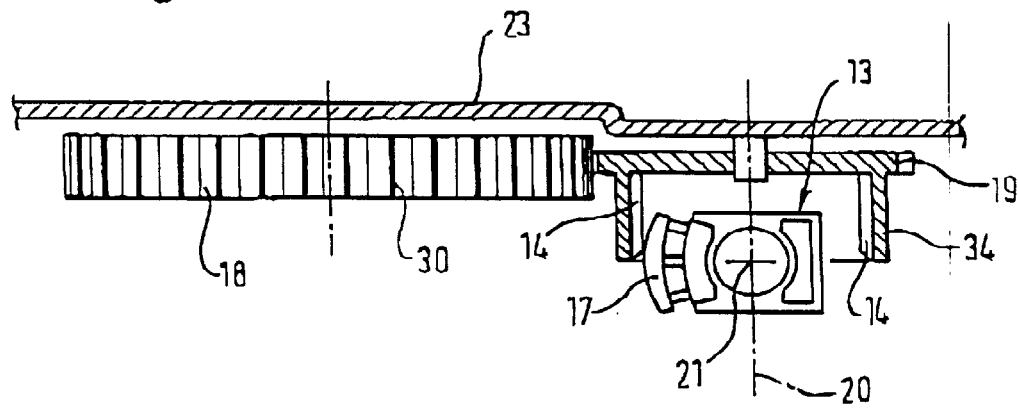

In accordance with FIG. 2 the auxiliary inner blocking tooth crown 14 is attached at the inner side of a hollow cylinder 34 which projects coaxially from the gear 19. The acceleration sensor 13 can be displaced in the interior of the hollow cylinder 34 about the axis of rotation 20 of the gear 19 and at the same time about a further axis 21 which is perpendicular to it. The auxiliary pawl 17 is curved in the plan view of FIG. 2 in such a manner that it can enter into a blocking engagement with the auxiliary inner blocking tooth crown 14 even at different angular positions of the acceleration sensor 13 about the axis 21.

Figure 3:
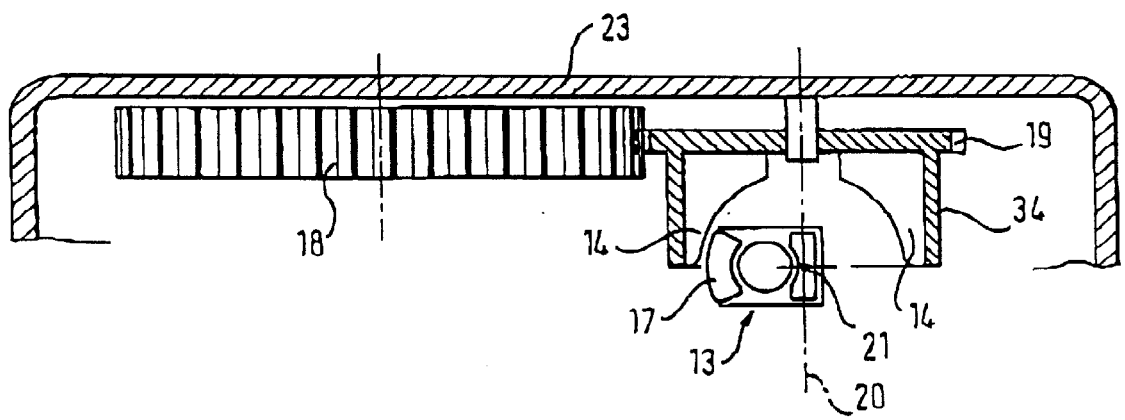

In accordance with FIG. 3 the hollow cylinder 34 has an auxiliary inner blocking tooth crown 14 with hemispherically curved blocking teeth into which a correspondingly curved auxiliary pawl 17 of the acceleration sensor 13 engages. Here as well the acceleration sensor 13 can be displaced both about the axis of rotation 20 and about an axis 21 which is perpendicular to it and can then be fixed again. The hemispherical design of the teeth of the inner tooth crown 14 ensures that the auxiliary pawl 17 can come into blocking engagement with the blocking teeth of the auxiliary inner blocking tooth crown 14 at any rotational position about the vertical axis 21.

Figure 4:
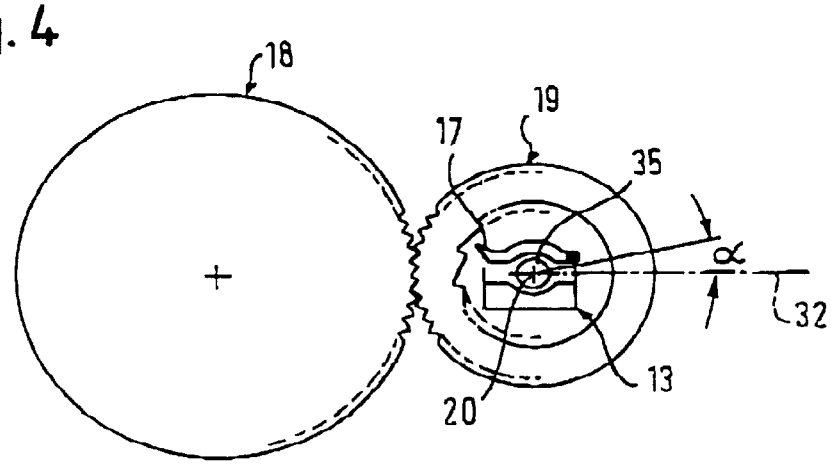

It is clear from FIG. 4 how the acceleration sensor 13 which is equipped with the central ball 35 can be pivoted about the axis of rotation 20 by an angle α in order that the functional plane 32 of the acceleration sensor 13 can be brought into the horizontal orientation

What is claimed is:

1. A safety belt apparatus comprising:
 a belt roller carrying a safety belt, the roller being biased in a belt wind-up direction and capable of being blocked by a tooth blocking mechanism to prevent the belt from extending away from the roller;
 an acceleration sensor, having a movable mass, for triggering the tooth blocking mechanism;
 the tooth blocking mechanism comprising:
  a position control gear engaged with a secondary gear;
  wherein the position control gear is positioned co-axially with the belt roller and includes a main blocking tooth crown;
  wherein an inner side of the secondary gear includes an auxiliary blocking tooth crown;
  an auxiliary pawl operatively connected to the acceleration sensor so that when a condition requiring locking of the belt is detected by the acceleration sensor the auxiliary pawl moves to enter into a blocking arrangement with the auxiliary blocking tooth crown to thereby prevent the rotation of the secondary gear and the position control gear;
 a main pawl connected to the belt roller and configured to engage the main blocking tooth crown so that further rotation of the roller is stopped and further extension of the belt away from the roller is stopped when rotation of the position control gear stops.

2. The apparatus of claim 1, further comprising a transmission positioned to operatively connect the position control gear and the main pawl.

3. The apparatus of claim 1, wherein the acceleration sensor is positioned in an interior of the auxiliary tooth crown and the secondary gear.

4. The apparatus of claim 3, wherein the acceleration sensor and the auxiliary pawl are configured so that when the acceleration sensor is positioned away from an axis of rotation of the secondary gear the auxiliary pawl enters into a blocking position with the auxiliary blocking tooth when required.

5. The apparatus of claim 1, wherein the auxiliary blocking tooth crown includes a plurality of teeth, each tooth having a concavely curved surface that forms part of a sphere, the center of the sphere being positioned on an axis of rotation of the secondary gear.

6. The apparatus of claim 5, wherein the acceleration sensor is positioned in an interior of the secondary gear and the auxiliary pawl is curved so that when the acceleration sensor is positioned at a location away from the axis of rotation of the secondary gear the auxiliary pawl enters into a blocking position with the auxiliary blocking tooth when required.

7. The apparatus of claim 1, wherein each of the auxiliary blocking tooth crown and the main blocking tooth crown includes a plurality of teeth, wherein the main blocking tooth crown has a larger number of teeth.

8. The apparatus of claim 7, wherein the ratio of the number of teeth between the main blocking tooth crown and the auxiliary blocking tooth crown is substantially the same as the ratio of the diameter of position control gear to the diameter of the secondary gear.

9. The apparatus of claim 1, wherein the auxiliary blocking tooth crown may be rotated relative to the secondary gear.

10. The apparatus of claim 1, wherein the position control gear and the secondary gear are configured to be disengaged so that the secondary gear can be rotated relative to the position control gear.

11. The apparatus of claim 1, wherein the position control gear has a diameter of approximately one half a diameter of the position control gear.

12. The apparatus of claim 1, wherein the position control gear has a diameter of approximately one third a diameter of the position control gear.

13. The apparatus of claim 1, wherein the position control gear has a diameter of approximately one fourth a diameter of the position control gear.

14. The apparatus of claim 1, wherein the movable mass is a ball.

* * * * *